United States Patent [19]

Kato et al.

[11] Patent Number: 4,658,001
[45] Date of Patent: Apr. 14, 1987

[54] PEROXYCARBONATE GROUP-CONTAINING COPOLYMER AND METHOD FOR MANUFACTURE THEREOF

[75] Inventors: Kenji Kato, Kariya; Yuji Okada; Kazuyoshi Aoshima, both of Aichi, all of Japan

[73] Assignee: Nippon Oils & Fats Co., Ltd., Tokyo, Japan

[21] Appl. No.: 784,049

[22] Filed: Oct. 4, 1985

[30] Foreign Application Priority Data

Oct. 12, 1984 [JP] Japan .................... 59-212719
Jun. 28, 1985 [JP] Japan .................... 60-140154

[51] Int. Cl.$^4$ .................... C08F 18/24; C08F 118/24
[52] U.S. Cl. .................... 526/218.1; 526/223;
526/229; 526/230.5; 526/230; 526/232;
526/232.3; 526/291; 526/292.5; 526/232.5;
526/313; 526/314; 526/232.1; 526/219.6
[58] Field of Search .................... 526/232.5, 314, 291,
526/313, 292.5, 218, 223, 229, 230.5, 230, 232, 232.3

[56] References Cited

U.S. PATENT DOCUMENTS 3,451,989  6/1969  Rekers et al. .................... 526/232.5

Primary Examiner—Edward J. Smith
Assistant Examiner—Peter F. Kulkosky
Attorney, Agent, or Firm—Oblon, Fisher, Spivak, McClelland & Maier

[57] ABSTRACT

A random copolymer comprising specific groups represented by the general formula:

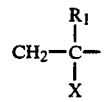

and specific peroxycarbonate structural units represented by the general formula:

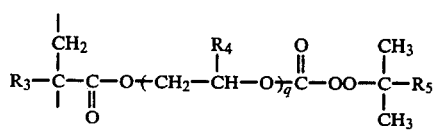

is produced by a method which comprises causing a compound of the formula:

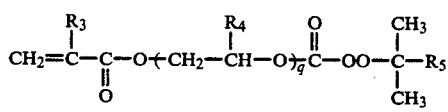

to react with a compound of the formula:

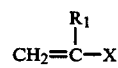

24 Claims, No Drawings

PEROXYCARBONATE GROUP-CONTAINING COPOLYMER AND METHOD FOR MANUFACTURE THEREOF

FIELD OF THE INVENTION AND RELATED ART STATEMENT

This invention relates to novel peroxycarbonate group-containing copolymers and to a method for the manufacture thereof, and more particularly to copolymers comprising specific peroxycarbonate structural units and specific unsaturated-monomer structural units and to a method for the manufacture thereof. The copolymers of the invention are excellent in storage stability and useful as intermediates for the production of graft copolymers and as materials for the modification of polymers. The method of this invention for the manufacture of the aforementioned copolymers enjoys the advantage that the polymerization involved can be carried out at temperatures falling in a wide range.

Various methods have been introduced to the art which are aimed at copolymerizing peroxy group-containing unsaturated monomers with unsaturated monomers. For example, the specification of British Pat. No. 1,041,088 discloses a method for the copolymerization of t-butyl peroxymethacrylate with methyl methacrylate and the specification of Japanese Patent Publication SHO 46(1971)-34100 discloses a method for the copolymerization of di(t-butyl peroxy)-fumarate with styrene. In the "Polymer Chemistry", Vol. 17, pp 183–186 (1960), there is disclosed a method for the copolymerization of t-butyl peroxycrotonate with vinyl acetate. The specification of Japanese Patent Publication SHO 57(1982)-42083 discloses a method for the copolymerization of t-butyl peroxyallylcarbonate with vinyl chloride.

It has been known, however, that when the aforementioned peroxy group-containing unsaturated monomers are used in the copolymerization there ensue the following problems. t-Butyl peroxymethacrylate, di(t-butyl peroxy)-fumarate, and t-butyl peroxycrotonate are invariably α-unsaturated peroxy esters. When they are copolymerized with unsaturated monomers under ordinary conditions and consequently incorporated in the resultant copolymers, the peroxy ester groups are thermally decomposed at a notably increased velocity because these peroxy ester groups are converted from α-substituted unsaturated carboxylic acids to peroxy ester groups of tertiary carboxylic acids or are converted from unsaturated carboxylic acids to peroxy ester groups of secondary caboxylic acids. As a result, the copolymers consequently obtained are deficient in storage stability. For the peroxy ester groups in the copolymers to remain in a state free from the drawbacks mentioned above, it becomes necessary that the relevant polymerizations should be carried out at lower temperatures or in a short time.

Generally, a reduction in polymerization temperature or in polymerization time has an adverse effect of notably lowering the polymerization velocity or preventing the polymerization from proceeding to completion.

t-Butyl peroxyallylcarbonate is an unsaturated peroxycarbonate. When it is copolymerized with a vinyl monomer and incorporated in the resultant copolymer, since the peroxycarbonate group is thermally stable, the polymerization can be carried out at a relatively high temperature. Since the copolymerizability of the unsaturated group is in a non-conjugate type, the unsaturated monomers usable for the copolymerization are limited to vinyl chloride and vinyl acetate.

In the circumstances, the desirability of developing a method which produces copolymers free from the drawbacks suffered by the products of the conventional methods and excellent in storage stability and which permits selction of an unsaturated monomer for the copolymerization from a wide range of unsaturated monomers has been finding growing recognition.

OBJECT AND SUMMARY OF THE INVENTION

An object of this invention is to provide a copolymer comprising an unsaturated monomer and a peroxycarbonate group, which excels in storage stability and permits selection of polymerization temperature in a wide range.

Another object of this invention is to provide a method for the manufacture of the aforementioned copolymer.

The inventors continued a study aimed at attaining the objects described above. They have consequently found that the objects are attained by using a specific unsaturated peroxycarbonate as a peroxy group-containing unsaturated monomer and that the resultant copolymer is novel to the art. The present invention has been perfected consequently.

To be specific, the present invention relates to a peroxycarbonate group-containing copolymer containing 1 to 10,000 random copolymers as repeating units each containing 1 to 10,000 groups of at least one kind represented by the general formula (I):

$$-CH_2-\underset{\underset{X}{|}}{\overset{\overset{R_1}{|}}{C}}-  \quad (I)$$

(wherein $R_1$ stands for one member selected from the class consisting of hydrogen and methyl and X for one member selected from the class consisting of

substituted phenyl, —CN,

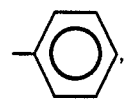

where $R_2$ stands for one member selected from the class consisting of hydrogen and alkyls of 1 to 8 carbon atoms,

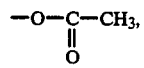

and Cl) and 1 to 1,000 peroxycarbonate structural unit of at least one kind represented by the general formula (II):

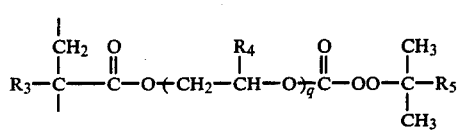
(II)

(wherein R₃ stands for one member selected from the class consisting of hydrogen and alkyls of 1 and 2 carbon atoms, R₄ for one member selected from the class consisting of hydrogen and methyl, R₅ for one member selected from the class consisting of straight and branched alkyls of 1 to 9 carbon atoms, phenyl, and alkyl-substituted phenyls of 1 to 3 carbon atoms, and q for an integer of the value of 1 or 2). This invention further relates to a method for the manufacture of the said peroxycarbonate group-containing copolymer, which method is characterized by copolymerizing at least one kind of unsaturated peroxycarbonate represented by the general formula (III):

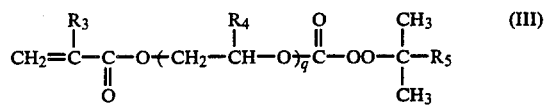
(III)

(wherein R₃ stands for one member selected from the class consisting of hydrogen and alkyls of 1 and 2 carbon atoms, R₄ for one member selected from the class consisting of hydrogen and methyl, R₅ for one member selected from the class consisting of straight and branched alkyls of 1 to 9 carbon atoms, phenyl, and alkyl-substituted phenyls of 1 to 3 carbon atoms, and q for an integer of the value of 1 or 3 carbon atoms, and q for an integer of the value of 1 or 2) with at least one kind of unsaturated monomer represented by the general formula (IV):

$$\begin{array}{c} R_1 \\ | \\ CH_2=C-X \end{array} \quad (IV)$$

(wherein R₁ stands for one member selected from the class consisting of hydrogen and methyl and X for one member selected from the class consisting of

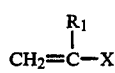, substituted phenyl, —CN,

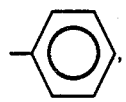

[where R₂ stands for one member selected from the class consisting of hydrogen and alkyls of 1 to 8 carbon atoms],

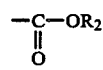, and Cl).

DESCRIPTION OF THE PREFERRED EMBODIMENTS

First, the groups represented by the general formula (I) and the peroxycarbonate structural units represented by the general formula (II) which are component elements of the copolymer of this invention will be described below.

Concrete examples of the groups represented by the general formula (I) are shown below.

Preferred examples follow.

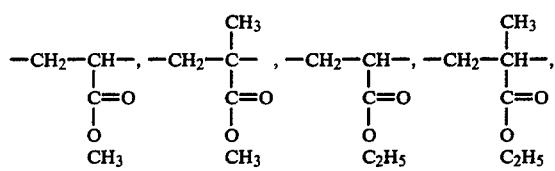

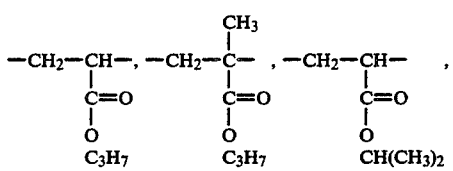

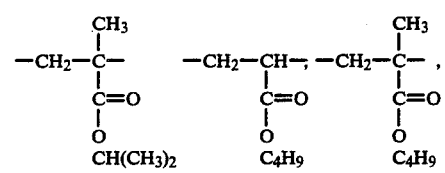

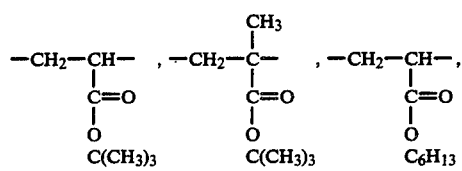

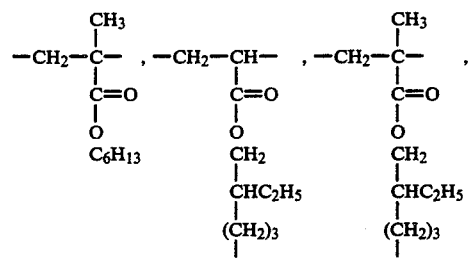

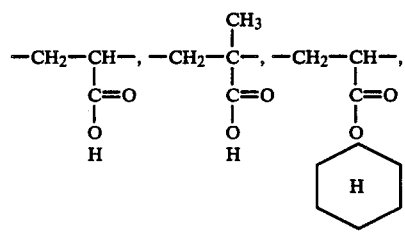

-continued
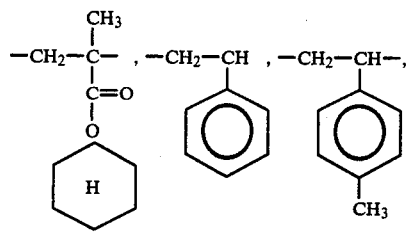
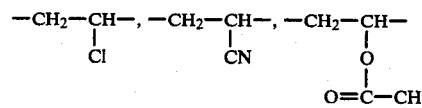
Other examples follow.
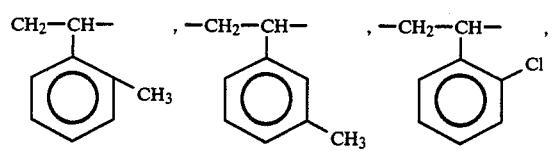
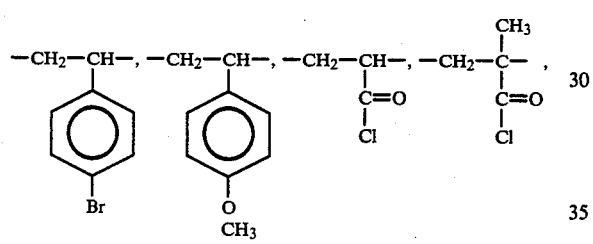
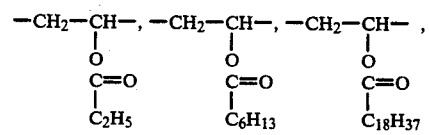
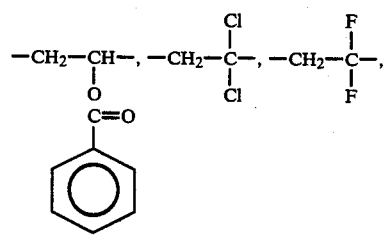
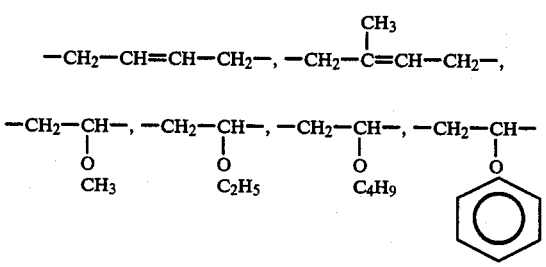
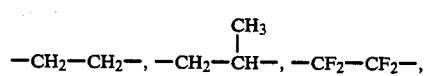
-continued
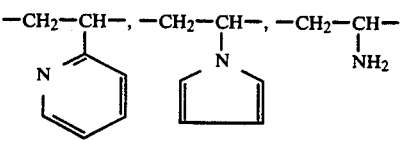
Now, concrete examples of the structural units represented by the general formula (II) are shown below.
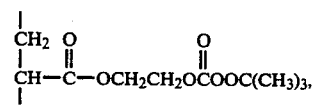
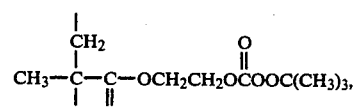
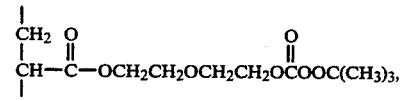
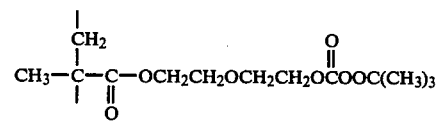
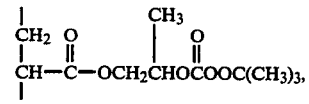
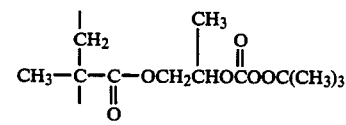
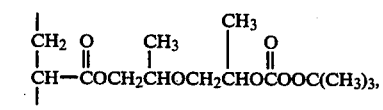
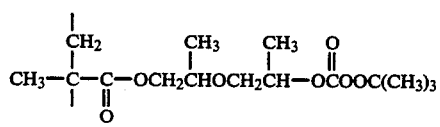
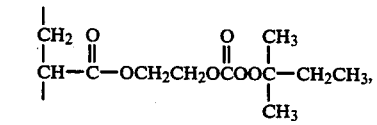

$$CH_3-\underset{\underset{CH_3}{|}}{\overset{\overset{CH_2}{|}}{C}}-\overset{O}{\overset{\|}{C}}-OCH_2CH_2O\overset{O}{\overset{\|}{C}}-\underset{\underset{CH_3}{|}}{\overset{\overset{CH_3}{|}}{C}}-CH_2CH_3,$$

$$\underset{\underset{CH_3}{|}}{\overset{\overset{CH_2}{|}}{CH}}-\overset{O}{\overset{\|}{C}}-O-CH_2CH_2OCH_2CH_2O\overset{O}{\overset{\|}{C}}-\underset{\underset{CH_3}{|}}{\overset{\overset{CH_3}{|}}{C}}-CH_2CH_3,$$

$$CH_3-\underset{\underset{CH_3}{|}}{\overset{\overset{CH_2}{|}}{C}}-\underset{\underset{O}{\|}}{C}-OCH_2CH_2OCH_2CH_2O\overset{O}{\overset{\|}{C}}-\underset{\underset{CH_3}{|}}{\overset{\overset{CH_3}{|}}{C}}-CH_2CH_3,$$

$$\underset{\underset{CH_3}{|}}{\overset{\overset{CH_2}{|}}{CH}}-COCH_2\underset{\underset{CH_3}{|}}{\overset{CH_3}{|}}{CH}OCO\underset{\underset{CH_3}{|}}{\overset{CH_3}{|}}{C}-CH_2CH_3,$$

$$CH_3-\underset{\underset{CH_3}{|}}{\overset{\overset{CH_2}{|}}{C}}-\underset{\underset{O}{\|}}{C}-OCH_2\underset{\underset{CH_3}{|}}{\overset{CH_3}{|}}{CH}OCO\underset{\underset{CH_3}{|}}{\overset{CH_3}{|}}{C}-CH_2CH_3,$$

$$\underset{\underset{CH_3}{|}}{\overset{\overset{CH_2}{|}}{CH}}-COCH_2\underset{CH_3}{\overset{CH_3}{|}}{CH}OCH_2\underset{\underset{O}{\|}}{\overset{CH_3}{|}}{CH}OCOO\underset{\underset{CH_3}{|}}{\overset{CH_3}{|}}{C}CH_2CH_3,$$

$$CH_3-\underset{\underset{CH_3}{|}}{\overset{\overset{CH_2}{|}}{C}}-\underset{\underset{O}{\|}}{C}-OCH_2\underset{CH_3}{\overset{CH_3}{|}}{CH}OCH_2\underset{\underset{O}{\|}}{\overset{CH_3}{|}}{CH}OCOO\underset{\underset{CH_3}{|}}{\overset{CH_3}{|}}{C}CH_2CH_3,$$

$$\underset{\underset{CH_3}{|}}{\overset{\overset{CH_2}{|}}{CH}}-COCH_2CH_2O\overset{O}{\overset{\|}{C}}OO\underset{\underset{CH_3}{|}}{\overset{CH_3}{|}}{C}CH_2CH_2CH_3,$$

$$CH_3-\underset{\underset{O}{\|}}{\overset{\overset{CH_2}{|}}{C}}-\underset{\underset{O}{\|}}{C}-OCH_2CH_2O\overset{O}{\overset{\|}{C}}OO\underset{\underset{CH_3}{|}}{\overset{CH_3}{|}}{C}CH_2CH_2CH_3,$$

$$\underset{\underset{CH_3}{|}}{\overset{\overset{CH_2}{|}}{CH}}-COCH_2CH_2OCH_2CH_2O\overset{O}{\overset{\|}{C}}OO\underset{\underset{CH_3}{|}}{\overset{CH_3}{|}}{C}CH_2CH_2CH_3,$$

$$CH_3-\underset{\underset{O}{\|}}{\overset{\overset{CH_2}{|}}{C}}-\underset{\underset{O}{\|}}{C}-OCH_2CH_2OCH_2CH_2O\overset{O}{\overset{\|}{C}}OO\underset{\underset{CH_3}{|}}{\overset{CH_3}{|}}{C}CH_2CH_2CH_3,$$

$$\underset{\underset{CH_3}{|}}{\overset{\overset{CH_2}{|}}{CH}}-COCH_2\underset{\underset{CH_3}{|}}{\overset{CH_3}{|}}{CH}OCOO\underset{\underset{CH_3}{|}}{\overset{CH_3}{|}}{C}CH_2CH_2CH_3,$$

$$CH_3-\underset{\underset{O}{\|}}{\overset{\overset{CH_2}{|}}{C}}-COCH_2\underset{\underset{CH_3}{|}}{\overset{CH_3}{|}}{CH}OCOO\underset{\underset{CH_3}{|}}{\overset{CH_3}{|}}{C}CH_2CH_2CH_3,$$

$$\underset{\underset{CH_3}{|}}{\overset{\overset{CH_2}{|}}{CH}}-COCH_2\underset{CH_3}{\overset{CH_3}{|}}{CH}OCH_2\underset{\underset{CH_3}{|}}{\overset{CH_3}{|}}{CH}OCOOC-CH_2CH_2CH_3,$$

$$CH_3-\underset{\underset{O}{\|}}{\overset{\overset{CH_2}{|}}{C}}-OCH_2\underset{CH_3}{\overset{CH_3}{|}}{CH}OCH_2\underset{\underset{O}{\|}}{\overset{CH_3}{|}}{CH}OCOO\underset{\underset{CH_3}{|}}{\overset{CH_3}{|}}{C}CH_2CH_2CH_3,$$

$$\underset{\underset{CH_3}{|}}{\overset{\overset{CH_2}{|}}{CH}}-COCH_2CH_2OCOO\underset{\underset{CH_3}{|}}{\overset{CH_3}{|}}{C}-C_6H_5,$$

$$CH_3-\underset{\underset{O}{\|}}{\overset{\overset{CH_2}{|}}{C}}-COCH_2CH_2OCOO\underset{\underset{CH_3}{|}}{\overset{CH_3}{|}}{C}-C_6H_5,$$

$$\underset{\underset{CH_3}{|}}{\overset{\overset{CH_2}{|}}{CH}}-COCH_2CH_2OCH_2CH_2OCOO\underset{\underset{CH_3}{|}}{\overset{CH_3}{|}}{C}-C_6H_5,$$

$$CH_3-\underset{\underset{O}{\|}}{\overset{\overset{CH_2}{|}}{C}}-OCH_2CH_2OCH_2CH_2OCOO\underset{\underset{CH_3}{|}}{\overset{CH_3}{|}}{C}-C_6H_5,$$

$$\underset{\underset{CH_3}{|}}{\overset{\overset{CH_2}{|}}{CH}}-COCH_2\underset{\underset{CH_3}{|}}{\overset{CH_3}{|}}{CH}OCOO\underset{\underset{CH_3}{|}}{\overset{CH_3}{|}}{C}-C_6H_5,$$

$$CH_3-\underset{\underset{O}{\|}}{\overset{\overset{CH_2}{|}}{C}}-OCH_2\underset{\underset{CH_3}{|}}{\overset{CH_3}{|}}{CH}OCOO\underset{\underset{CH_3}{|}}{\overset{CH_3}{|}}{C}-C_6H_5,$$

$$\underset{\underset{CH_3}{|}}{\overset{\overset{CH_2}{|}}{CH}}-COCH_2\underset{CH_3}{\overset{CH_3}{|}}{CH}OCH_2\underset{\underset{CH_3}{|}}{\overset{CH_3}{|}}{CH}OCOO\underset{\underset{CH_3}{|}}{\overset{CH_3}{|}}{C}-C_6H_5,$$

-continued $$CH_3-\underset{\underset{O}{\overset{\overset{CH_2}{|}}{\|}}}{\overset{}{C}}-\underset{\underset{}{\overset{CH_3}{|}}}{C}-OCH_2\underset{\underset{}{\overset{CH_3}{|}}}{CH}-OCH_2\underset{\underset{}{\overset{}{CH}}}{\overset{\overset{O}{\|}}{C}}OCOO\underset{\underset{}{\overset{CH_3}{|}}}{\overset{\overset{CH_3}{|}}{C}}-\underset{}{\bigcirc},$$

$$C_2H_5-\underset{\underset{O}{\overset{\overset{CH_2}{|}}{\|}}}{\overset{}{C}}-COCH_2CH_2O\overset{\overset{O}{\|}}{C}OOC(CH_3)_3,$$

$$C_2H_5-\underset{\underset{O}{\overset{\overset{CH_2}{|}}{\|}}}{\overset{}{C}}-COCH_2\underset{\underset{}{\overset{CH_3}{|}}}{CH}O\overset{\overset{O}{\|}}{C}OOC(CH_3)_3,$$

$$CH_3-\underset{\underset{O}{\overset{\overset{CH_2}{|}}{\|}}}{\overset{}{C}}-\overset{\overset{O}{\|}}{C}-OCH_2CH_2OCOO\underset{\underset{}{\overset{CH_3}{|}}}{\overset{\overset{CH_3}{|}}{C}}-CH_2-\underset{\underset{}{\overset{CH_3}{|}}}{\overset{\overset{CH_3}{|}}{C}}-CH_3,$$

$$CH_3-\underset{\underset{O}{\overset{\overset{CH_2}{|}}{\|}}}{\overset{}{C}}-\overset{}{C}-OCH_2\underset{\underset{}{\overset{CH_3}{|}}}{CH}-O\overset{\overset{O}{\|}}{C}OO\underset{\underset{}{\overset{CH_3}{|}}}{\overset{\overset{CH_3}{|}}{C}}-CH_2-\underset{\underset{}{\overset{CH_3}{|}}}{\overset{\overset{CH_3}{|}}{C}}-CH_3$$

The peroxycarbonate group-containing copolymer of the present invention contains random copolymers as repeating units each containing groups of at least one kind represented by the aforementioned general formula (I) and structural units of at least one kind represented by the aforementioned general formula (II).

The method of the present invention consists in copolymerizing an unsaturated peroxycarbonate with an unsaturated monomer in the presence of a radical polymerization initiator, providing that the unsaturated peroxycarbonate and the unsaturated monomer are specifically defined by the general formulas (III) and (IV) respectively.

The unsaturated peroxycarbonate is represented by the general formula:

$$CH_2=\underset{\underset{O}{\overset{\overset{R_3}{|}}{\|}}}{\overset{}{C}}-C-O(CH_2-\underset{\underset{}{\overset{R_4}{|}}}{CH}-O)_{\overline{q}}\overset{\overset{O}{\|}}{C}-OO-\underset{\underset{}{\overset{CH_3}{|}}}{\overset{\overset{CH_3}{|}}{C}}-R_5 \quad (III)$$

(wherein $R_3$ stands for one member selected from the class consisting of hydrogen and alkyls of 1 and 2 carbon atoms, $R_4$ for one member selected from the class consisting of hydrogen and methyl, $R_5$ for one member selected from the class consisting of straight and branched alkyls of 1 to 9 carbon atoms, phenyl, and alkyl-substituted phenyls of 1 to 3 carbon atoms, and q for an integer of the value of 1 or 2).

The unsaturated monomer is represented by the general formula:

$$CH_2=\underset{\underset{}{\overset{R_1}{|}}}{C}-X \quad (IV)$$

(wherein $R_1$ stands for one member selected from the class consisting of hydrogen and methyl and X for one member selected from the class consisting of $$-\bigcirc,$$

substituted phenyl, —CN, $$-\overset{\overset{O}{\|}}{C}-OR_2$$

[where $R_2$ stands for one member selected from the class consisting of hydrogen and alkyls of 1 to 8 carbon atoms], $$-O-\overset{\overset{O}{\|}}{C}-CH_3,$$

and Cl).

Specific examples of the unsaturated peroxycarbonate represented by the aforementioned general formula (III) to be used in the present invention include t-butyl peroxyacryloyloxyethyl carbonate, t-butyl peroxymethacryloyloxyethyl carbonate, t-butyl peroxyacryloyloxyethoxyethyl carbonate, t-butyl peroxymethacryloyloxyethoxyethyl carbonate, t-butyl peroxyacryloyloxyisopropyl carbonate, t-butyl peroxymethacryloyloxyisopropyl carbonate, t-butyl peroxyacryloyloxyisopropoxyisopropyl carbonate, t-butyl peroxymethacryloyloxyisopropoxyisopropyl carbonate, t-amyl peroxyacryloyloxyethyl carbonate, t-amyl peroxymethacryloyloxyethyl carbonate, t-amyl peroxyacryloyloxyethoxyethyl carbonate, t-amyl peroxymethacryloyloxyethoxyethyl carbonate, t-amyl peroxyacryloyloxyisopropyl carbonate, t-amyl peroxymethacryloyloxyisopropyl carbonate, t-amyl peroxyacryloyloxyisopropoxyisopropyl carbonate, t-amyl peroxymethacryloyloxyisopropoxyisopropyl carbonate, t-hexyl peroxyacryloyloxyethyl carbonate, t-hexyl peroxymethacryloyloxyethyl carbonate, t-hexyl peroxyacryloyloxyethoxyethyl carbonate, t-hexyl peroxymethacryloyloxyethoxyethyl carbonate, t-hexyl peroxyacryloyloxyisopropyl carbonate, t-hexyl peroxymethacryloyloxyisopropyl carbonate, t-hexyl peroxyacryloyloxyisopropoxyisopropyl carbonate, t-hexyl peroxymethacryloyloxyisopropoxyisopropyl carbonate, cumyl peroxyacryloyloxyethyl carbonate, cumyl peroxymethacryloyloxyethyl carbonate, cumyl peroxyacryloyloxyethoxyethyl carbonate, cumyl peroxymethacryloyloxyethoxyethyl carbonate, cumyl peroxyacryloyloxyisopropyl carbonate, cumyl peroxymethacryloyloxyisopropyl carbonate, cumyl peroxyacryloyloxyisopropoxyisopropyl carbonate, cumyl peroxymethacryloyloxyisopropoxyisopropyl carbonate, t-butyl peroxy(ethyl)acryloyloxyethyl carbonate, t-butyl peroxy(ethyl)acryloyloxyisopropyl carbonate, 1,1,3,3-tetramethylbutyl peroxymethacryloyloxyethyl carbonate, and 1,1,3,3-tetramethylbutyl peroxymethacryloyloxyisopropyl carbonate.

The unsaturated peroxy carbonates enumerated above are desirable because they exhibit satisfactory copolymerizability with various unsaturated monomers, because their peroxy carbonate groups show high efficiency in initiating polymerization, because the unsaturated peroxy carbonates enjoy high yields in synthesis, and because they are chemically stable.

Examples of the unsaturated monomer of the general formula (IV) copolymerizable with the unsaturated peroxy carbonate of general formula (III) include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, t-butyl acrylate, t-butyl methacrylate, n-hexyl acrylate, n-hexyl methacrylate, 2-ethylhexyl acrylate, 2-ethylhexyl methacrylate, acrylic acid, methacrylic acid, cyclohexyl acrylate, cyclohexyl methacrylate, styrene, p-methyl styrene vinyl chloride, acrylonitrile and vinyl acetate. Other unsaturated monomers which are also usable for the copolymerization are o-methyl styrene, m-methyl styrene, o-chlorostyrene, p-bromostyrene, p-methoxy styrene, acrylic acid chloride, methacrylic acid chloride, vinyl propionate, vinyl caproate, vinyl stearate, vinyl benzoate, vinylidene chloride, vinylidene fluoride, butadiene isoprene, methylvinyl ether, ethylvinyl ether, n-butylvinyl ether, phenylvinyl ether, ethylene, propylene, tetrafluoroethylene, vinyl pyridine, vinyl imidazole, and acrylamide. These unsaturated monomers can be used either singly or in the form of a mixture of two or more members.

In the copolymerization of the unsaturated peroxycarbonate and the unsaturated monomer represented by the aforementioned general formulas in accordance with the present invention, the weight ratio of the two monomers participating in the copolymerization is desired to be such that the amount of the unsaturated peroxycarbonate falls in the range of 0.0001 to 10, preferably 0.001 to 1, based on the amount of the unsaturated monomer taken as unity. If the ratio is less than 0.0001:1, the produced copolymer contains the peroxycarbonate group in too small an amount for the copolymer to serve as a useful intermediate for the production of a graft polymer. If the ratio exceeds 10:1, the produced copolymer contains the peroxycarbonate group in too large an amount to preclude the possibility of inducing abrupt decomposition of the copolymer during the course of handling or heating.

The copolymerization temperature for the purpose of this invention is desired to fall in the range of 0° to 120° C., preferably 40° to 100° C. If this temperature falls short of 0° C., the polymerization velocity is notably lowered and, consequently, the polymerization time is elongated possibly so much as to prevent the polymerization from proceeding to complete. If this temperature exceeds 120° C., there ensues the disadvantage that the peroxycarbonate group contained in the copolymer undergoes decomposition and induces a secondary reaction.

The radical polymerization initiator to be used in the copolymerization of the present invention can be suitably selected from among the organic peroxide type initiators, azo compound type initiators, and inorganic type initiators which have heretofore been utilized as polymerization initiators in the conventional reactions of polymerization. This selection is made on the basis that the temperature at which the time required for the initial concentration to decrease to half of the original value, one criterion for decomposition velocity, is 10 hours (namely, the 10 hours' half-life temperature) falls in the range of 10° to 130° C. Examples of the polymerization initiator fulfilling the requirement described above include dibenzoyl peroxide, dilauroyl peroxide, isobutylyl peroxide, acetylcyclohexyl sulfonyl peroxide, t-butyl peroxy pivalate, cumyl peroxy neodecanoate, t-butyl peroxy acetate, t-butyl peroxy benzoate, 1,1-bis(t-butyl peroxy)cyclohexane, dicumyl peroxide, di-t-butyl peroxide, azo-bis-isobutylonitrile, 2,2'-azo-bis-(2,4-dimethylvaleronitrile), t-butyl hydroperoxide, cumene hydroperoxide, hydrogen peroxide, potassium persulfate, and ammonium persulfate.

The polymerization initiator is desired to be added to the copolymerization system in an amount falling within the range of 0.01 to 10% by weight based on the total amount of the unsaturated peroxycarbonate and the unsaturated monomer of the aforementioned general formulas used for the copolymerization. If the amount is less than 0.01% by weight the polymerization velocity is notably lowered to jeopardize the economy of the operation itself. If the amount exceeds 10% by weight, the polymerization proceeds abruptly and even violently so as to jeopardize the safety of operation.

During the normal operation of the polymerization, it is desirable to bring the polymerization to completion within a period of 1 to 20 hours by suitably selecting the polymerization temperature and the amount of the polymerization initiator.

The copolymer of the present invention can be manufactured by any of the conventional methods of polymerization such as bulk polymerization, solution polymerization, suspension polymerization, and emulsion polymerization. The operation of the polymerization may be batchwise or continuous. In the polymerization, the molecular weight of the copolymer to be produced can be adjusted in a wide range by incorporating in the copolymerization system a molecular weight regulator in an amount of 0.01 to 5% by weight, based on the total amount of the comonomers used. Examples of the molecular weight regulator are aldehydes, halogenated hydrocarbons, mercaptans, lower fatty acids, alcohols, and lower fatty acid esters. The average molecular weight of the copolymer of the present invention obtained as described above generally falls in the range of 2,000 to 10,000,000.

As concerns the chemical structure of the copolymer produced by the method of the present invention, the peroxycarbonate group and the other unsaturated monomer group present in the copolymer can be identified by the infrared absorption spectrum and the measurement of the amount of active oxygen and the percentage composition of the components of the copolymer can be determined based on the amount of active oxygen mentioned above and the measurement of the unclear magnetic resonance spectrum. The average molecular weight of the copolymer can be found from the numerical value of the limiting viscosity number.

The peroxycarbonate group-containing copolymers of the present invention are novel compounds. The unsaturated peroxycarbonates represented by the aforementioned general formula (III) exhibit satisfactory copolymerizability with a wide range of unsaturated monomers. By altering the mixing ratio of the two monomers participating in the copolymerization in a wide range, therefore, a peroxycarbonate group-containing copolymer having a polymerization ratio suiting the purpose of application and meeting the nature of copolymer being sought can be obtained. Further in the polymerization, the time required for the polymerization can be shortened and the polymerization degree can be adjusted with ease because the polymerization is enabled to proceed at a temperature selected in a wide range. Moreover, the copolymer to be obtained by the method of this invention excels in stability of storage and serves advantageously as a modifier for polymers and as an intermediate for graft copolymers.

Now, the present invention will be described more specifically below with reference to a referential experiment, working examples, and examples of use. Referential Experiment (synthesis of unsaturated peroxycarbonate):

t-Butyl peroxy methacryloyloxyethyl carbonate was synthesized by following the method disclosed in the specification of USSR Pat. No. 374,284 with necessary modifications. In a four-neck flask fitted with a stirrer, a thermometer, and a dropping funnel and having an inner volume of 1 liter, 336.6 g (1.2 mols) of an aqueous potassium hydroxide solution of a concentration of 20% by weight was placed. Then, 154.5 g (1.2 mols) of an aqueous t-butyl hydroperoxide solution of a concentration of 70% by weight was added at 20° C. to the flask. Subsequently, 207.1 g of methacryloyloxyethyl chloroformate of a purity of 93% by weight held at 20° C. under vigorous agitation was added dropwise over a period of 30 minutes. After completion of this addition, the contents of the flask were kept agitated for two hours. Then, the reaction solution was transferred into a funnel, there to be deprived of an aqueous phase. The organic phase consequently obtained was washed twice with 300 ml of cold water at 5° C. and dried over magnesium sulfate. The dried organic phase was filtered to obtain 206.0 g of a colorless, transparent solution. By iodometry, the active oxygen content of this solution was found to be 6.24%. In the infrared absorption spectrum of this solution, the absorption by the carbonyl group of the methacrylic ester group was observed at 1720 cm$^{-1}$ and the absorption by the carbonyl group of the peroxy carbonate group at 1790 cm$^{-1}$. The data mentioned above evince that the procedure described above has formed t-butyl peroxymethacryloyloxyethyl carbonate. The purity of the copolymer calculated from the active oxygen content is 96% and the yield, therefore, is 80.3 mol%.

The copolymer was dissolved in benzene in a concentration of 0.05 mol/liter and tested for thermal decomposition velocity. Consequently, the 10 hours' half-life temperature was found to be 104° C. Other unsaturated peroxycarbonates represented by the aforementioned general formula (III) were synthesized by following the procedure described above and were tested for molecular weight, active oxygen content (theoretical value), purity, yield, number of absorption waves of carbonyl group observed in the infrared absorption spectrum, and 10 hours' half life temperature. The results are shown in Table 1.

TABLE 1

| Unsaturated peroxy-carbonate (Acronym) | Molecular weight | Active oxygen content (theoretical value %) | Purity (% by weight) | Yield (mol %) | Infrared absorption spectrum ($\nu_{C=O}$ cm$^{-1}$) | 10 hours' half-life temperature (°C.) |
|---|---|---|---|---|---|---|
| t-butyl peroxymethacryloyloxyethyl carbonate (BPMC) | 246.3 | 6.50 | 96.0 | 80.3 | 1720 1790 | 104 |
| t-butyl peroxyacryloyloxyethyl carbonate (BPAC) | 232.2 | 6.89 | 94.5 | 84.5 | 1725 1790 | 103 |
| t-hexyl peroxymethacryloyloxyethyl carbonate (HPMC) | 274.3 | 5.83 | 92.0 | 88.2 | 1720 1790 | 101 |
| 1,1,3,3-tetramethylbutyl peroxymethacryloyloxyethyl carbonate (TMBC) | 302.4 | 5.29 | 88.0 | 82.3 | 1720 1790 | 99 |
| cumyl peroxymethacryloyloxyethyl carbonate (CPMC) | 308.3 | 5.19 | 87.0 | 77.5 | 1720 1795 | 96 |
| t-butyl peroxymethacryloyloxy-ethoxyethyl carbonate (BMEEC) | 290.3 | 5.51 | 94.0 | 87.5 | 1720 1790 | 104 |
| t-butyl peroxyacryloyloxy-ethoxyethyl carbonate (BAEEC) | 276.3 | 5.79 | 92.0 | 86.0 | 1720 1790 | 104 |
| t-butyl peroxymethacryloyloxy-isopropyl carbonate (BPMPC) | 260.3 | 6.15 | 95.5 | 80.1 | 1720 1790 | 104 |
| t-butyl peroxyacryloyloxyiso-propyl carbonate (BPAPC) | 246.3 | 6.50 | 94.0 | 84.3 | 1725 1790 | 103 |
| t-hexyl peroxymethacryloyloxy-isopropyl carbonate (HPMPC) | 288.3 | 5.55 | 91.0 | 88.0 | 1720 1790 | 101 |
| 1,1,3,3-tetramethylbutyl peroxymethacryloyloxyisopropyl carbonate (TMBPC) | 316.4 | 5.06 | 88.5 | 82.1 | 1720 1790 | 99 |
| cumyl peroxymethacryloyloxy-isopropyl carbonate (CPMPC) | 322.3 | 4.97 | 87.3 | 77.2 | 1720 1790 | 96 |
| t-butyl peroxymethacryloyloxy-isopropoxyisopropyl carbonate (BMPPC) | 318.4 | 5.03 | 93.1 | 87.7 | 1720 1790 | 104 |
| t-butyl peroxyacryloyloxy-isopropoxyisopropyl carbonate (BAPPC) | 304.3 | 5.26 | 91.2 | 86.6 | 1720 1790 | 104 |

The unsaturated peroxides used for comparison were similarly tested. The results are shown in Table 2.

TABLE 2

| Unsaturated Peroxide (Acronym) | Molecular weight | Active oxygen content (theoretical value %) | Purity (% by weight) | Infrared absorption spectrum ($\nu_{C=O}$ cm$^{-1}$) | 10 hours' half-life temperature (°C.) |
|---|---|---|---|---|---|
| t-butyl peroxyallyl | 176.4 | 9.07 | 70.0 | 1780 | 107 |

TABLE 2-continued

| Unsaturated Peroxide (Acronym) | Molecular weight | Active oxygen content (theoretical value %) | Purity (% by weight) | Infrared absorption spectrum ($v_{C=O}$ cm$^{-1}$) | 10 hours' half-life temperature (°C.) |
|---|---|---|---|---|---|
| carbonate (BPAL) | | | | | |
| t-butyl peroxy acrylate (BPA) | 144.2 | 11.10 | 70.0 | 1735 | 102 |
| di-t-butylperoxy fumarate (DBPF) | 228.6 | 14.00 | 50.0 | 1760 | 106 |

EXAMPLE 1

(Preparation of peroxycarbonate group-containing copolymer by suspension polymerization):

In a four-neck flask fitted with a stirrer, a thermometer, a Dimroth condenser, a nitrogen gas inlet tube, and a dropping funnel and having an inner volume of 1 liter, 400 ml of an aqueous polyvinyl alcohol (saponification degree 89%) solution of a concentration of 0.2% by weight was placed and adjusted to 50° C.

Separately, a mixed solution was prepared by combining 198.0 g of styrene refined by a conventional method, 2.08 g of BPMC (purity 96.0% by weight) synthesized by the procedure indicated in Referential Experiment, and 4.04 g of diisopropyl peroxycarbonate (purity 99.0% by weight) selected as a polymerization initiator. This mixed solution, kept under agitation, was added dropwise at 50° C. over a period of 10 minutes into the flask, simultaneously with continued introduction of nitrogen. After completion of this addition, the contents of the flask were kept agitated continuously for 10 hours, to produce a suspension. Then, from the reesultant suspension, white solid beads recognized as a copolymer between the styrene and the BPMC were separated by filtration, washed with water, and dried under a vacuum. The solid beads thus obtained weighed 170.5 g.

Portions of the solid beads were repeatedly dissolved and precipitated in a toluene-methanol solution for the purpose of cleaning. The cleaned solid beads were subjected to various measurements. As the result, the active oxygen content was found to be 0.06%. In the infrared absorption spectrum, the absorptions by the carbonyl groups of the ester group and the peroxycarbonate group in the BPMC structural unit of the copolymer were observed respectively at 1710 and 1790 cm$^{-1}$. In the proton nuclear magnetic resonance spectrum, the spectrum of the hydrogen of the benzene ring of the styrene structural unit in the copolymer was observed at 6.4 to 7.4 ppm and the spectrum of the hydrogen of the ethylene group of the BPMC structural unit was observed at 3.4 to 4.4 ppm. The ratio of the BPMC structural units in the copolymer, calculated from the value of their integration, was found to be 0.98%. The data clearly support that the aforementioned white solid beads were those of a peroxycarbonate group-containing copolymer. The limiting viscosity number of the copolymer, in a benzene solution at 25° C., was 0.16. The raw materials used for the copolymerization, the conditions for the copolymerization, and the results obtained of the produced copolymer are shown in Table 3A.

To test the copolymer for stability of storage, the copolymer was left standing in a constant temperature bath at 50° C. for one month and, at the end of the standing, was analyzed for its active oxygen content. As the result, no decline of the active oxygen content was observed. The results are shown in Table 7.

EXAMPLES 2–12

Copolymers were prepared by following the procedure of Example 1, except that the kinds of unsaturated peroxycarbonates and their amounts used, the kinds of unsaturated monomers and their amounts used, the kinds and amounts of polymerization initiators, the copolymerization temperature and copolymerization time were varied as shown in Tables 3A and 3B. The conditions of copolymerization and the analyses of the produced peroxycarbonate group-containing copolymers are shown in Tables 3A, 3B. The data on storage stability as measured by the method of Example 1 with necessary modifications are shown in Table 7.

EXAMPLES 13 AND 14

Copolymers were prepared by following the procedure of Example 1, except that BAEEC (purity 92.0% by weight) and BAPPC (purity 91.2% by weight) were used as unsaturated peroxycarbonates, methyl methacrylate was used as an unsaturated monomer, a solution of 0.04 g of sodium lauryl sulfate, 0.53 g of polysodium acrylate, and 1.62 g of sodium sulfate in 200 ml of water was used as a suspension dispersant, and the amounts of the monomers used, the temperatures of copolymerization and the periods of polymerization indicated in Tables 3A, 3B were used instead. The analyses of the produced peroxycarbonate group-containing copolymers and the data on storage stability obtained of the copolymers are shown respectively in Tables 3A, 3B and Table 7.

EXAMPLES 15 AND 16

In an autoclave of stainless steel having an inner volume of 400 ml, 200 ml of an aqueous polyvinyl alcohol (saponification degree 89%) solution of a concentration of 0.1% by weight, 2.13 g of BMEEC (purity 94.0% by weight) or BMPPC (purity 93.1% by weight) as an unsaturated peroxide, and 0.4 g of diisobutylyl peroxide (purity 50.0% by weight) as a polymerization initiator were placed and cooled to −30° C. To the resultant mixture was added 98.0 g of vinyl chloride monomer. Then, the autoclave had the empty space therein displaced with nitrogen gas and was tightly stoppered. The autoclave was immersed in a constant temperature water bath kept at 40° C. and the contents thereof were agitated at the rate of 32 revolutions per minute for 12 hours. Consequently, there were obtained copolymers of BMEEC and BMPPC respectively with vinyl chloride. Thereafter, the autoclave was cooled and opened by the removal of the stopper. From the opened autoclave, the unaltered vinyl chloride monomer was removed and a white powder was withdrawn as the reaction product. This white powder was washed with water and dried under a vacuum. Consequently, the copolymers were obtained respectively in the amounts of 84.0 g and 82.5 g. The white powder was a peroxycarbonate group-containing copolymer. The conditions of copolymerization, the analyses of the produced copolymers, and the data on their storage stability are shown in Tables 3A, 3B and Table 7.

COMPARATIVE EXPERIMENT 1

A reaction was carried out by following the procedure of Example 1, except that t-butyl peroxyallyl carbonate (BPAL; purity 70.0% by weight) was used as an unsaturated peroxide in the place of BPMC. This reaction produced a white solid. The active oxygen content of this product was found to be 0%. In the infrared absorption spectrum of this product, the absorption by carbonyl group was not found. The data indicate that the reaction failed to give rise to any peroxycarbonate group-containing copolymer. The conditions of the reaction and the analyses of the reaction product are shown in Table 3B.

COMPARATIVE EXPERIMENT 2

A reaction was carried out by following the procedure of Example 2, except that t-butyl peroxyacrylate (BPA; purity 70.0% by weight), an unsaturated polyoxy ester, was used in the place of BPAC. The white solid consequently obtained by this reaction was insoluble in toluene or tetrahydrofuran. The active oxygen content of this product was found to be 0.11%. The reaction conditions, the analyses of the product, and the data on its storage stability are shown in Table 3B and Table 7.

TABLE 3A

| | Preparation of copolymer by suspension polymerization | | | | | | | | |
|---|---|---|---|---|---|---|---|---|---|
| | Example | | | | | | | | |
| | 1 | 2 | 3 | 4 | 5 | 6 | 7 | 8 | 9 |
| Unsaturated peroxide, | BPMC | BPAC | TMBC | BMEEC | CPMC | BPAC | BPMPC | BPAPC | TMBPC |
| purity (% by weight) | 96.0 | 94.5 | 88.0 | 94.0 | 87.0 | 94.5 | 95.5 | 94.0 | 88.5 |
| amount used (g) | 2.08 | 52.9 | 90.9 | 106.4 | 172.4 | 1.1 | 2.09 | 53.0 | 90.2 |
| Unsaturated monomer*, | styrene | styrene | styrene | styrene | styrene | vinyl acetate | styrene | styrene | styrene |
| amount used (g) | 198.0 | 150.0 | 120.0 | 100.0 | 50.0 | 99.0 | 198.0 | 150.0 | 120.0 |
| Weight ratio of unsaturated peroxide to unsaturated monomer | 0.01 | 0.33 | 0.67 | 1.0 | 1.5 | 0.01 | 0.01 | 0.33 | 0.67 |
| Polymerization initiator**, | BPO | IPP | LPO | BPO | BPO | LPO | BPO | IPP | LPO |
| amount added (% by weight based on total amount of monomers) as pure product | 1.0 | 2.0 | 1.0 | 0.3 | 0.5 | 1.0 | 1.0 | 2.0 | 1.0 |
| Copolymerization temperature (°C.) | 90 | 50 | 70 | 80 | 80 | 50 | 90 | 50 | 70 |
| Copolymerization time (hours) | 10 | 6 | 2 | 1 | 1 | 2 | 10 | 6 | 2 |
| Copolymer Amount produced (g) | 170.5 | 77.3 | 20.5 | 13.3 | 18.2 | 77.5 | 185.5 | 80.6 | 25.5 |
| Active oxygen content (%) | 0.06 | 1.64 | 2.00 | 2.40 | 3.42 | 0.03 | 0.06 | 7.55 | 1.92 |
| Limiting viscosity number*** (100 ml/g) | 0.16 | 0.14 | 0.18 | 0.18 | 0.17 | 0.88 | 0.15 | 0.14 | 0.19 |

*The unsaturated monomers were invariably refined by the conventional method prior to use.
**BPO: dibenzoyl peroxide
IPP: diisopropyl peroxy dicarbonate
LPO: dilauroyl peroxide
***Measured in acetone solution at 30° C. when vinyl acetate was used as unsaturated monomer, and in benzene solution at 25° C. when styrene was used as unsaturated monomer.

TABLE 3B

| | Preparation of copolymer by suspension polymerization | | | | | | | | |
|---|---|---|---|---|---|---|---|---|---|
| | Example | | | | | | | Comparative Experiment | |
| | 10 | 11 | 12 | 13 | 14 | 15 | 16 | 1 | 2 |
| Unsaturated peroxide, | BMPPC | CPMPC | BPAPC | BAEEC | BAPPC | BMEEC | BMPPC | BPAL | BPA |
| purity (% by weight) | 93.1 | 87.5 | 94.0 | 92.0 | 91.2 | 94.0 | 93.1 | 70.0 | 70.0 |
| amount used (g) | 107.4 | 171.4 | 1.1 | 5.4 | 5.45 | 2.13 | 2.13 | 2.86 | 7.14 |
| Unsaturated monomer*, | styrene | styrene | vinyl acetate | methyl methacrylate | methyl methacrylate | vinyl chloride | vinyl cloride | styrene | methyl methacrylate |
| amount used (g) | 100.0 | 50.0 | 99.0 | 95.0 | 95.0 | 98.0 | 98.0 | 198.0 | 95.0 |
| Weight ratio of unsaturated peroxide to unsaturated monomer | 1.0 | 1.5 | 0.01 | 0.05 | 0.05 | 0.02 | 0.02 | 0.01 | 0.05 |
| Polymerization initiator** | BPO | BPO | LPO | AIBN | AIBN | IBPO | IBPO | BPO | AIBN |
| amount added (% by weight based on total amount of monomers) as pure product | 0.3 | 0.5 | 1.0 | 0.5 | 0.5 | 0.2 | 0.2 | 1.0 | 0.5 |
| Copolymerization temperature (°C.) | 80 | 80 | 50 | 70 | 70 | 40 | 40 | 90 | 70 |
| Copolymerization time (hours) | 1 | 1 | 2 | 8 | 8 | 12 | 12 | 10 | 8 |
| Copolymer Amount produced (g) | 15.1 | 20.3 | 80.4 | 88.6 | 89.2 | 84.0 | 82.5 | 120.3 | 90.6 |
| Active oxygen content (%) | 2.19 | 3.44 | 0.03 | 0.32 | 0.31 | 0.04 | 0.04 | 0 | 0.11 |
| Limiting viscosity | 0.17 | 0.18 | 0.88 | 0.58 | 0.59 | 1.21 | 1.19 | — | insoluble |

TABLE 3B-continued

| | Preparation of copolymer by suspension polymerization | | | | | | | |
|---|---|---|---|---|---|---|---|---|
| | Example | | | | | | | Comparative Experiment |
| | 10 | 11 | 12 | 13 | 14 | 15 | 16 | 1 | 2 |
| number*** (100 ml/g) | | | | | | | | | |

*The unsaturated monomers were invariably refined by the conventional method prior to use.
**BPO: dibenzoyl peroxide,
LPO: dilauroyl peroxide,
AIBN: azo-bis-isobutylonitrile,
IBPO: diisobutylyl peroxide
***Measured in acetone solution at 30° C. when vinyl acetate was used as unsaturated monomer in tetrahydrofuran solution at 25° C. when vinyl chloride was used as unsaturated monomer, and in benzene solution at 25° C. when other compound was used as unsaturated monomer.

EXAMPLE 17

(Preparation of peroxycarbonate group-containing copolymer by bulk polyerization):

A glass ampoule having an inner volume of 20 ml was filled with 2.08 g of BPMC (purity 96.0% by weight), 8.0 g of refined styrene, and 0.1 g of benzoyl peroxide (purity 99.8% by weight), displaced with nitrogen gas, and then sealed by fusion. This ampoule was kept immersed in a constant oil bath at 100° C. for one hour. Then, the ampoule was taken out of the bath, cooled, and opened. The reaction product was dropped into 500 ml of methanol and allowed to precipitate therein. The white solid consequently formed was separated by filtration and dried under a vacuum. The product consequently obtained weighed 5.8 g. The active oxygen content of the product was found to be 1.20%. In the infrared absorption spectrum of this product, absorptions by carbonyl group were observed at 1725 and 1795 cm$^{-1}$ and a characteristic absorption by benzene ring was observed below 1600 cm$^{-1}$. The data indicate that the white solid was a copolymer formed of styrene structural units and peroxycarbonate structural units. The conditions of copolymerization and the analyses of the produced copolymer are shown in Table 4A and the data on the copolymer's stability of storage are shown in Table 7.

EXAMPLES 18–28

Copolymers were prepared by following the procedure of Example 17, except that the kinds of unsaturated peroxycarbonates and their amounts used, the kinds of polymerization initiators and their amounts used, and the copolymerization temperatures, etc. were varied. The copolymerization conditions and the analyses of the produced copolymers and the data on their storage stability are shown in Tables 4A, 4B and Table 7.

COMPARATIVE EXPERIMENT 3

Copolymerization was carried out by following the procedure of Example 17, except that BPAL was used as an unsaturated peroxide. The reaction gave rise to a white solid. The active oxygen content of this white solid was 0%. In the infrared absorption spectrum of this product, no absorption by carbonyl group was observed in the range of 1,700 to 1,800 cm$^{-1}$. The data indicate that the reaction failed to produce a peroxycarbonate group-containing copolymer. The reaction conditions and the analyses of the product are shown in Table 4B.

COMPARATIVE EXPERIMENTS 4 AND 5

Copolymers were prepared by following the procedure of Example 17, except that BPA and DBPF were used as unsaturated peroxides, and the kinds of unsaturated monomers and the amounts added and the kinds of polymerization initiators and their amounts used were as indicated in Table 4B. The analyses of the produced copolymers and the data on their storage stability are shown in Table 4B and Table 7.

TABLE 4A

| | Preparation of copolymer by bulk polymerization | | | | | | | |
|---|---|---|---|---|---|---|---|---|
| | Example | | | | | | | |
| | 17 | 18 | 19 | 20 | 21 | 22 | 23 | 24 |
| Unsaturated peroxide, | BPMC | BPMPC | BPAC | BPAPC | BMEEC | TMBC | BMPPC | TMBPC |
| purity (% by weight) | 96.0 | 95.0 | 94.5 | 94.0 | 94.0 | 88.0 | 93.1 | 88.5 |
| amount used (g) | 2.1 | 2.1 | 5.3 | 5.3 | 1.1 | 6.8 | 1.1 | 6.8 |
| Unsaturated monomer, | styrene | styrene | methyl methacrylate | methyl methacrylate | styrene | styrene | styrene | styrene |
| amount used (g) | 8.0 | 8.0 | 5.0 | 5.0 | 9.0 | 4.0 | 9.0 | 4.0 |
| Weight ratio of unsaturated peroxide to unsaturated monomer | 0.25 | 0.25 | 1.0 | 1.0 | 0.11 | 1.5 | 0.11 | 1.5 |
| Polymerization initiator, | BPO | BPO | BPO | BPO | IPP | AIBN | IPP | AIBN |
| amount added (% by weight based on total amount of monomers)as pure product | 0.5 | 0.5 | 0.5 | 0.5 | 2.0 | 0.5 | 2.0 | 0.5 |
| Copolymerization temperature (°C.) | 100 | 100 | 80 | 80 | 60 | 80 | 60 | 80 |
| Copolymerization time (hours) | 1 | 1 | 0.5 | 0.5 | 4 | 2 | 4 | 2 |
| Copolymer Amount produced (g) | 5.8 | 6.3 | 2.6 | 3.2 | 9.2 | 3.1 | 9.6 | 4.0 |
| Active oxygen content (%) | 1.20 | 1.30 | 3.26 | 3.21 | 0.52 | 3.10 | 0.50 | 3.02 |
| Limiting viscosity number (100 ml/g) | 0.14 | 0.14 | 0.36 | 0.37 | 0.16 | 0.17 | 0.15 | 0.16 |

TABLE 4B

| | Preparation of copolymer by bulk polymerization | | | | | | |
|---|---|---|---|---|---|---|---|
| | Example | | | | Comparative Experiment | | |
| | 25 | 26 | 27 | 28 | 3 | 4 | 5 |
| Unsaturated peroxide, | CPMC | CPMPC | HPMC | HPMPC | BPAL | BPA | DBPF |
| purity (% by weight) | 87.0 | 87.5 | 92.0 | 92.2 | 70.0 | 70.0 | 50.0 |
| amount used (g) | 9.2 | 9.2 | 0.1 | 0.1 | 2.9 | 7.1 | 0.2 |
| Unsaturated monomer, | styrene | styrene | vinyl acetate | vinyl acetate | styrene | methyl methacrylate | vinyl acetate |
| amount used (g) | 2.0 | 2.0 | 9.9 | 9.9 | 8.0 | 5.0 | 9.9 |
| Weight ratio of unsaturated peroxide to unsaturated monomer | 4.0 | 4.0 | 0.01 | 0.01 | 0.25 | 1.0 | 1.0 |
| Polymerization initiator, | IPP | IPP | LPO | LPO | BPO | BPO | LPO |
| amount added (% by weight based on total amount of monomers) as pure product | 3.0 | 3.0 | 0.2 | 0.2 | 0.5 | 0.5 | 0.2 |
| Copolymerization temperature (°C.) | 50 | 50 | 60 | 60 | 100 | 80 | 60 |
| Copolymerization time (hours) | 6 | 6 | 1 | 1 | 1 | 0.5 | 1 |
| Copolymer Amount produced (g) | 8.2 | 8.3 | 7.7 | 7.5 | 4.6 | 2.4 | 8.0 |
| Active oxygen content (%) | 3.56 | 3.47 | 0.04 | 0.03 | 0 | 3.65 | 0.06 |
| Limiting viscosity number (100 ml/g) | 0.18 | 0.19 | 1.58 | 1.56 | — | insoluble | insoluble |

EXAMPLE 29

(Preparation of peroxycarbonate group-containing copolymer by solution polymerization):

A four-neck flask provided with a stirrer, a thermometer, a Dimroth condenser, and a nitrogen gas inlet tube and having an inner volume of 500 ml was charged with 2.1 g of BPMC (purity 96.0% by weight), 98.0 g of refined styrene, and 200 g of ethylene glycol monobutyl ether (abbreviated as "butyl cellosolve") as a solvent, with the flask temperature subsequently adjusted to 100° C. Then, 1.0 g of BPO (purity 99.0% by weight) was added as a polymerization initiator into the flask interior. The contents of the flask were stirred for copolymerization under continued flow of nitrogen gas for a period of five hours. Then, the reaction solution was added dropwise into 3 liters of cold methanol. The white solid precipitated consequently therein was dried under a vacuum. The product so obtained weighed 82.0 g. The active oxygen content of this white solid was found to be 0.11%. In the infrared absorption spectrum of the product, absorptions by carbonyl group were observed at 1710 and 1790 cm$^{-1}$. The limiting viscosity number of this product in benzene solution (100 ml/g) was found to be 0.22. The conditions of polymerization and the analyses of the produced copolymers and data on its storage stability are shown in Table 5 and Table 7.

EXAMPLES 30–40

Copolymers were prepared by following the procedure of Examples 29, except that the kinds of unsaturated peroxycarbonates and their amounts added, the kinds of unsaturated monomers and their amounts added, the kinds of solvents and their amounts added, the kind of polymerization initiators and their amounts added, the copolymerization temperatures, and the periods of copolymerization time were varied. The conditions of copolymerization and the analyses of the produced copolymers and the data on their storage stability are shown in Tables 5A, 5B and Table 7.

COMPARATIVE EXPERIMENTS 6–8

Copolymerizations were tried by following the procedure of Example 29, except the kinds of unsaturated peroxides and unsaturated monomers and their amounts added, the kinds of solvents and their amounts added, the kinds of polymerization initiators and their amounts added, and the temperatures and periods of polymerization were varied. The conditions of polymerization, the analyses of the produced polymers, and the data on storage stability obtained of polymers possessed of active oxygen are shown in Table 5B and Table 7.

TABLE 5A

| | Preparation of copolymer by solution polymerization | | | | | | | |
|---|---|---|---|---|---|---|---|---|
| | Example | | | | | | | |
| | 29 | 30 | 31 | 32 | 33 | 34 | 35 | 36 |
| Unsaturated peroxide, | BPMC | BMEEC | BPAC | HPMC | CPMC | BAEEC | BPMPC | BMPPC |
| purity (% by weight) | 96.0 | 94.0 | 94.5 | 92.0 | 87.0 | 92.0 | 95.5 | 93.1 |
| amount used (g) | 2.1 | 21.3 | 1.1 | 21.7 | 57.5 | 1.1 | 2.1 | 21.5 |
| Unsaturated monomer, | styrene | styrene | n-butyl acrylate | 2-ethyl- hexyl methacrylate | methyl methacrylate | vinyl acetate | styrene | styrene |
| amount used (g) | 98.0 | 80.0 | 99.0 | 80.0 | | | 98.0 | 80.0 |
| Weight ratio of unsaturated peroxide to unsaturated monomer | 0.02 | 0.25 | 0.01 | 0.25 | 1.0 | 0.01 | 0.02 | 0.25 |
| Solvent | ethylene glycol monobutyl ether | toluene | iso- propyl alcohol | toluene | toluene | methanol | ethylene glycol monobutyl ether | toluene |
| amount used (g) | 200 | 200 | 200 | 200 | 200 | 200 | 200 | 200 |
| Polymerization initiator, | BPO | TBZ* | IPP | BPO | BPO | IPP | BPO | TBZ* |
| amount added (% by weight based on total amount of monomers) as pure product | 1.0 | 0.2 | 0.5 | 0.5 | 2.0 | 1.0 | 1.0 | 0.2 |
| Copolymerization temperature (°C.) | 100 | 100 | 50 | 90 | 70 | 60 | 100 | 100 |

TABLE 5A-continued

| | Preparation of copolymer by solution polymerization | | | | | | | |
|---|---|---|---|---|---|---|---|---|
| | Example | | | | | | | |
| | 29 | 30 | 31 | 32 | 33 | 34 | 35 | 36 |
| Copolymerization time (hours) | 5 | 2 | 10 | 3 | 6 | 2 | 5 | 2 |
| Copolymer Amount produced (g) | 82.0 | 57.6 | 88.0 | 87.6 | 84.2 | 76.2 | 81.0 | 57.2 |
| Active oxygen content (%) | 0.11 | 0.88 | 0.06 | 1.02 | 2.24 | 0.06 | 0.12 | 0.86 |
| Limiting viscosity number (100 ml/g) | 0.22 | 0.15 | 0.33 | 0.38 | 0.36 | 0.76 | 0.21 | 0.14 |

*TBZ: t-butyl peroxy benzoate

TABLE 5B

| | Preparation of copolymer by solution polymerization | | | | | | |
|---|---|---|---|---|---|---|---|
| | Example | | | | Comparative Experiment | | |
| | 37 | 38 | 39 | 40 | 6 | 7 | 8 |
| Unsaturated peroxide, | BPAPC | HPMPC | CPMPC | BAPPC | BPAL | BPA | DBPF |
| purity (% by weight) | 94.0 | 92.2 | 87.5 | 91.2 | 70.0 | 70.0 | 50.0 |
| amount used (g) | 1.1 | 21.7 | 57.2 | 1.1 | 28.6 | 71.4 | 2.0 |
| Unsaturated monomer, | sodium | 2-ethylehexyl | methyl | vinyl | styrene | methyl | vinyl |
| amount used (g) | acrylate | methacrylate | methacrylate | acetate | 80.0 | methacrylate | acetate |
| | 99.0 | 80.0 | 50.0 | 99.0 | | 50.0 | 99.0 |
| Weight ratio of unsaturated peroxide to unsaturated monomer | 0.01 | 0.25 | 1.0 | 0.01 | 0.25 | 1.0 | 0.01 |
| Solvent | iso-propyl alcohol | toluene | toluene | methanol | toluene | toluene | methanol |
| amount used (g) | 200 | 200 | 200 | 200 | 200 | 200 | 200 |
| Polymerization initiator, | IPP | BPO | IPP | TBZ | BPO | BPO | IPP |
| amount added (% by weight based on total amount of monomers) as pure product | 0.5 | 2.0 | 1.0 | 0.2 | 0.2 | 2.0 | 1.0 |
| Copolymerization temperature (°C.) | 50 | 90 | 70 | 60 | 100 | 70 | 60 |
| Copolymerization time (hours) | 10 | 3 | 6 | 2 | 2 | 6 | 2 |
| Copolymer Amount produced (g) | 85.9 | 88.2 | 85.9 | 75.5 | 52.4 | 80.2 | 77.3 |
| Active oxygen content (%) | 0.07 | 1.03 | 2.19 | 0.05 | 0 | 3.31 | 0.05 |
| Limiting viscosity number (100 ml/g) | 0.32 | 0.37 | 0.35 | 0.74 | — | insoluble | insoluble |

EXAMPLE 41

(Preparation of peroxycarbonate group-containing copolymer by emulsion polymerization):

In a four-neck flask fitted with a thermometer, a stirrer, a dropping funnel, and a nitrogen gas inlet tube and having an inner volume of 500 ml, 200 g of an aqueous solution having 1.0 g of sodium dodecyl sulfate dissolved therein was placed and then 20 g of a mixed solution prepared separately by combining 5.2 g of refined BPMC (purity 96.0% by weight) and 95.0 g of refined styrene was added. The contents of the flask were heated and adjusted to 50° C. under continued flow of nitrogen gas. Separately, 15 ml of aqueous solution having 0.6 g of potassium persulfate dissolved therein and 15 ml of an aqueous solution having 0.6 g of sodium hydrogensulfide dissolved therein were prepared and 1.5-ml portions of the two aqueous solutions were added to the interior of the flask. At intervals of 30 minutes thereafter, the mixed solution of BPMC and styrene, the aqueous potassium persulfate solution, and the aqueous sodium hydrogensulfide solution were added portionwise in rounds to a total of five rounds. After completion of the addition of all the solutions, the contents of the flask was kept agitated continuously for one hour. Thereafter, the flask was cooled and an emulsion consequently obtained in the flask was added for salting out into 1 liter of an aqueous of sodium sulfate of a concentration of 0.5 mol/liter. Resultant product was washed twice with 1 liter of water, and dried. Consequently, 62.3 g of white solid was obtained. The active oxygen content of this product was 0.31%. In the infrared absorption spectrum of this product, absorptions by carbonyl group were observed at 1710 and 1790 cm$^{-1}$. The limiting viscosity number of the product in benzene solution (100 ml/g) at 25° C. was 0.22. The condition of copolymerization, the analyses of the produced copolymers and the data on its storage stability are shown in Table 6 and Table 7.

EXAMPLES 42–45

Copolymers were prepared by following the procedure of Example 41, except that the kinds of unsaturated peroxycarbonates and unsaturated monomers and their amounts added, and the conditions of copolymerization were varied. The conditions of copolymerization, the analyses of the produced copolymers, and the data of their stability of storage are shown in Table 6 and Table 7.

COMPARATIVE EXPERIMENTS 9 AND 10

Copolymers were prepared by following the procedure of Example 41, except that the kinds of unsaturated peroxides and unsaturated monomers and their amounts added, and the conditions of copolymerization were varied. The analyses of the produced copolymers and the data on their stability of storage are shown in Table 6 and Table 7.

TABLE 6

Preparation of copolymer by emulsion polymerization

| | Example 41 | Example 42 | Example 43 | Example 44 | Example 45 | Example 46 | Comparative Experiment 9 | Comparative Experiment 10 |
|---|---|---|---|---|---|---|---|---|
| Unsaturated peroxide, | BPMC | BPAC | BAEEC | BPMPC | BPAPC | BAPPC | BPAL | BPA |
| purity (% by weight) | 96.0 | 94.5 | 92.0 | 95.5 | 94.0 | 91.2 | 70.0 | 70.0 |
| amount used (g) | 5.2 | 21.2 | 0.5 | 5.2 | 21.3 | 0.6 | 7.1 | 28.6 |
| Unsaturated monomer, | styrene | methyl methacrylate | vinyl acetate | styrene | methyl methacrylate | vinyl acetate | styrene | methyl methacrylate |
| amount used (g) | 95.0 | 80.0 | 90.5 | 95.0 | 80.0 | 99.5 | | 80.0 |
| Weight ratio of unsaturated peroxide to unsaturated monomer | 0.05 | 0.25 | 0.005 | 0.05 | 0.25 | 0.005 | 0.05 | 0.25 |
| Polymerization initiator and amount used: | 15 ml of aqueous solution of 4% by weight of potassium persulfate and 15 ml of aqueous solution of 4% by weight of sodium hydrogensulfide | | | | | | | |
| Copolymerization temperature (°C.) | 50 | | | | | | | |
| Copolymerization time (hours) | 3.5 | | | | | | | |
| Copolymer Amount produced (g) | 62.3 | 75.8 | 88.3 | 61.5 | 74.7 | 87.8 | 55.0 | 77.2 |
| Active oxygen content (%) | 0.31 | 1.24 | 0.27 | 0.30 | 1.23 | 0.27 | 0 | 0.88 |
| Limiting viscosity number (100 ml/g) | 0.22 | 0.47 | 1.56 | 0.21 | 0.46 | 1.56 | — | insoluble |

TABLE 7

Stability of copolymer during storage at 50° C.

| Copolymer | Active oxygen content of copolymer (%) Before storage | After storage | Ratio of decline (%) | Copolymer | Active oxygen content of copolymer (%) Before storage | After storage | Ratio of decline (%) |
|---|---|---|---|---|---|---|---|
| Example | | | | Example | | | |
| 1 | 0.06 | 0.06 | 0 | 27 | 0.04 | 0.04 | 0 |
| 2 | 1.64 | 1.62 | 1.2 | 28 | 0.03 | 0.03 | 0 |
| 3 | 2.00 | 2.00 | 0 | 29 | 0.11 | 0.10 | 0.9 |
| 4 | 2.40 | 2.40 | 0 | 30 | 0.88 | 0.88 | 0 |
| 5 | 3.42 | 3.41 | 0.3 | 31 | 0.06 | 0.06 | 0 |
| 6 | 0.03 | 0.03 | 0 | 32 | 1.02 | 1.00 | 2.0 |
| 7 | 0.06 | 0.06 | 0 | 33 | 2.24 | 2.22 | 0.9 |
| 8 | 1.55 | 1.53 | 1.3 | 34 | 0.06 | 0.06 | 0 |
| 9 | 1.92 | 1.91 | 0.5 | 35 | 0.12 | 0.12 | 0 |
| 10 | 2.19 | 2.19 | 0 | 36 | 0.86 | 0.86 | 0 |
| 11 | 3.44 | 3.43 | 0.3 | 37 | 0.07 | 0.07 | 0 |
| 12 | 0.03 | 0.03 | 0 | 38 | 1.03 | 1.02 | 1.0 |
| 13 | 0.32 | 0.32 | 0 | 39 | 2.19 | 2.18 | 0.5 |
| 14 | 0.31 | 0.31 | 0 | 40 | 0.05 | 0.05 | 0 |
| 15 | 0.04 | 0.04 | 0 | 41 | 0.31 | 0.31 | 0 |
| 16 | 0.04 | 0.04 | 0 | 42 | 1.24 | 1.22 | 1.6 |
| 17 | 1.20 | 1.20 | 0 | 43 | 0.27 | 0.27 | 0 |
| 18 | 1.30 | 1.30 | 0 | 44 | 0.30 | 0.29 | 0.8 |
| 19 | 3.26 | 3.26 | 0 | 45 | 1.23 | 1.22 | 0.8 |
| 20 | 3.21 | 3.20 | 0.3 | 46 | 0.27 | 0.26 | 3.7 |
| | | | | Comparative Experiment | | | |
| 21 | 0.52 | 0.50 | 0.4 | 2 | 0.11 | 0.03 | 72.7 |
| 22 | 3.10 | 3.10 | 0 | 4 | 3.65 | 0.22 | 94.0 |
| 23 | 0.50 | 0.49 | 2.0 | 5 | 0.06 | 0.01 | 83.3 |
| 24 | 3.02 | 3.01 | 0.3 | 7 | 3.31 | 0.65 | 80.4 |
| 25 | 3.56 | 3.52 | 1.1 | 8 | 0.05 | 0 | 100 |
| 26 | 3.47 | 3.45 | 0.6 | 10 | 0.88 | 0.05 | 94.3 |

It is noted from the working examples and the comparative experiments cited above that copolymers containing peroxycarbonate groups in proportions distributed in a wide range can be easily prepared because the unsaturated peroxycarbonates represented by the aforementioned general formula (III) exhibit satisfactory copolymerizability to a rich variety of unsaturated monomers and the polymerization can be carried out with high efficiency because the peroxycarbonate groups are stable to endure relatively high levels of polymerization temperature. It is further noted that during the course of polymerization, the peroxycarbonate groups do not undergo the phenomonon of ring cleavage and the secondary reactions such as cross-linking can be prevented, and the peroxycarbonate groups in the produced copolymers exhibit satisfactory storage stability.

Example of Use (grafting of polystyrene to polyethylene):

With a Banbury mixer type laboratory blast mill, 30 g of the copolymer (active oxygen content 0.06%) of BPMC with styrene prepared in Example 1 and 100 g of low-density polyethylene (polymerization degree 3,300) were mixed and kneaded at 200° C. for ten minutes. Then, the mix was removed from the mill and fractionated in a xylene-acetone type solvent to isolate a product having polystyrene grafted to polyethylene chain. The grafting efficiency was calculated from the isolated product. This efficiency was found to be 77.2%.

When the styrene-grafted polyethylene was molded, the molded article showed better surface property than the counter-type of polyethylene.

What is claimed is:

1. A peroxycarbonate group containing random copolymer, comprising:
   (a) at least one unit of the formula (I):

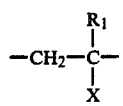

(I)

wherein $R_1$ represents a member selected from the group consisting of hydrogen and methyl and X represents a member selected from the group consisting of phenyl, substituted phenyl, cyano, acetyloxy, chloro and

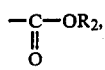

wherein $R_2$ represents a member selected from the group consisting of hydrogen, and $C_{1-8}$ alkyl; and
   (b) at least one unit of the formula (II):

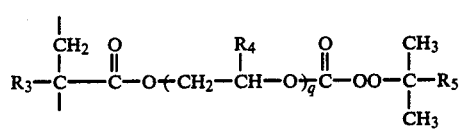

(II)

wherein $R_3$ represents a member selected from the group consisting of hydrogen and $C_{1-2}$ alkyl, $R_4$ is hydrogen or methyl, and $R_5$ is a member selected from the group consisting of branched and straight chain $C_{1-9}$ alkyl, phenyl, and $C_{1-3}$ alkyl substituted phenyl, and q is 1 or 2, the ratio of the units of formula (I) to units of formula (II) in the copolymer being equal to the weight ratio of the unsaturated monomer corresponding to unit (I) to the unsaturated monomer corresponding to unsaturated peroxycarbonate (II) ranging from 1:0.0001–10, as they react to form said copolymer, and said random copolymer having a viscosity-average molecular weight in the range of 2,000 to 10,000,000.

2. The peroxycarbonate group-containing copolymer according to claim 1, wherein said peroxycarbonate structural unit is at least one member selected from the group consisting of

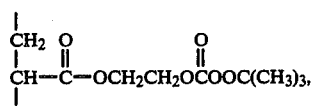

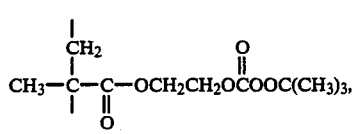

-continued

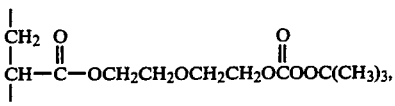

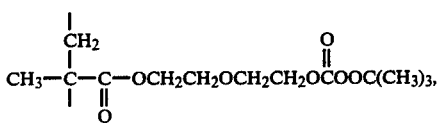

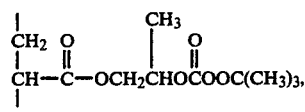

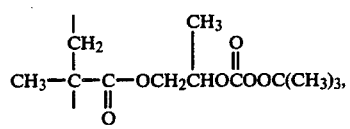

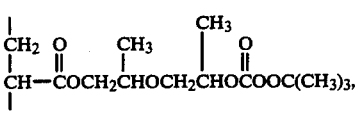

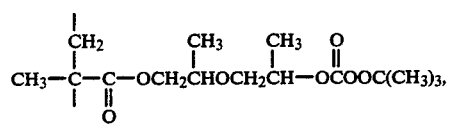

3. The peroxycarbonate group-containing copolymer according to claim 1, wherein said peroxycarbonate structural unit is

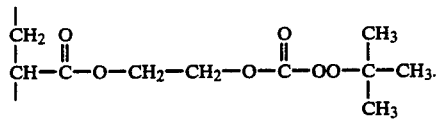

4. The peroxycarbonate group-containing copolymer according to claim 1, wherein said peroxycarbonate structural unit is

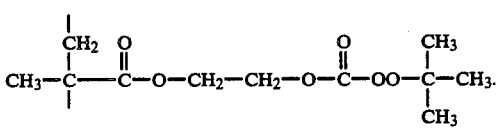

5. The peroxycarbonate group-containing copolymer according to claim 1, wherein said peroxycarbonate structural unit is

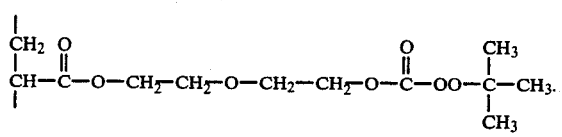

6. The peroxycarbonate group-containing copolymer according to claim 1, wherein said peroxycarbonate structural unit is

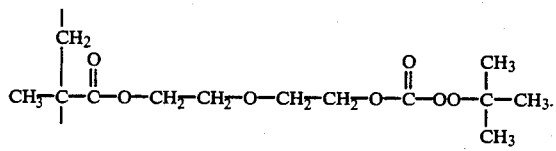

7. The peroxycarbonate group-containing copolymer according to claim 1, wherein said peroxycarbonate structural unit is

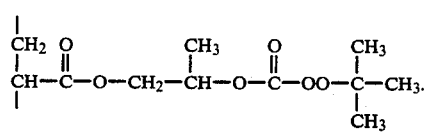

8. The peroxycarbonate group-containing copolymer according to claim 1, wherein said peroxycarbonate structural unit is

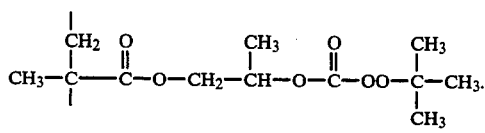

9. The peroxycarbonate group-containing copolymer according to claim 1, wherein said peroxycarbonate structural unit is

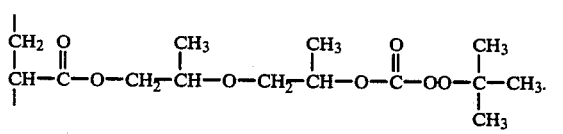

10. The peroxycarbonate group-containing copolymer according to claim 1, wherein said peroxycarbonate structural unit is

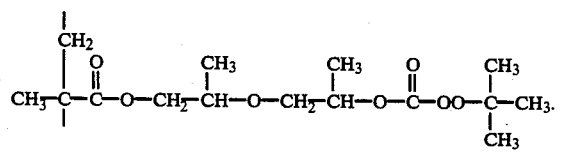

11. The peroxycarbonate group-containing copolymer according to claim 1, wherein said group represented by said general formula (I) is one member selected from the group consisting of

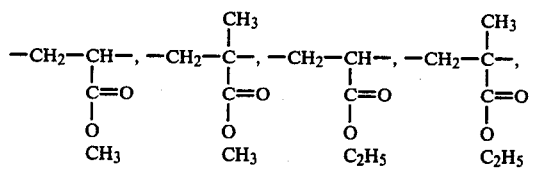

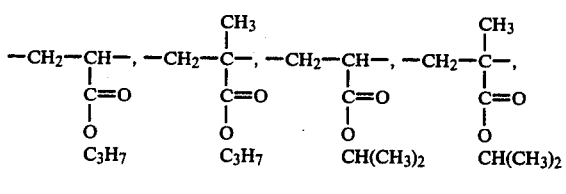

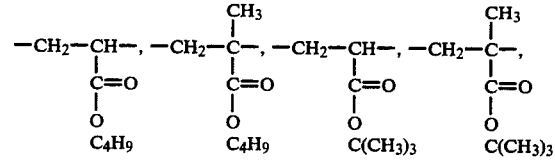

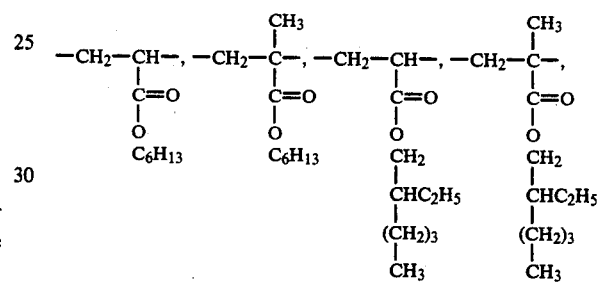

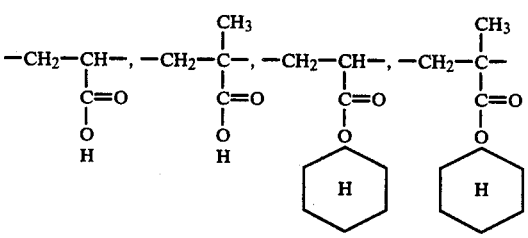

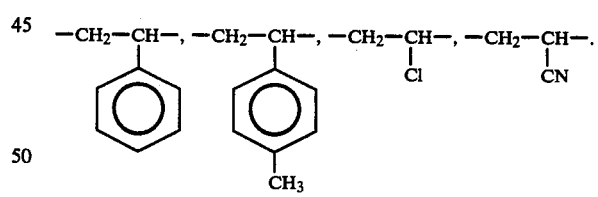

12. A method for the manufacture of a peroxycarbonate group-containing random copolymer, which comprises:

copolymerizing (a) an unsaturated peroxycarbonate of the formula (III):

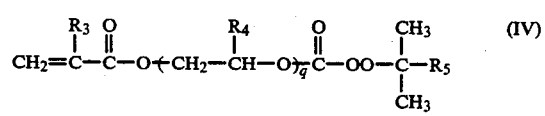

wherein $R_3$, $R_4$, $R_5$ and q are as defined in claim 25 with (b) an unsaturated monomer of the formula (IV):

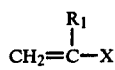

$$CH_2=\overset{R_1}{\underset{|}{C}}-X \quad (IV)$$

wherein $R_1$ and X are as defined in claim 11, with the weight ratio of the unsaturated monomer to the unsaturated peroxycarbonate ranging from 1:0.0001–10, in the presence of 0.01 to 10% by weight, based on the total weight of the unsaturated monomer and said unsaturated peroxycarbonate, of a poymerization initiator at a temperature in the range of 0° to 120° C.

13. The method according to claim 12, wherein said unsaturated peroxy is at least one member selected from the group consisting of t-butyl peroxyacryloyloxyethyl carbonate, t-butyl peroxymethacryloyloxyethyl carbonate, t-butyl peroxyacryloyloxyethoxyethyl carbonate, t-butyl peroxymethacryloyloxyethoxyethyl carbonate, t-butyl peroxyacryloyloxyisopropyl carbonate, t-butyl peroxymethacryloyloxyisopropyl carbonate, t-butyl peroxyacryloyloxyisopropoxyisopropyl carbonate, and t-butyl peroxymethacryloyloxyisopropoxyisopropyl carbonate.

14. The method according to claim 12, wherein said unsaturated peroxycarbonate is t-butyl peroxyacryloyloxyethyl carbonate.

15. The method according to claim 12, wherein said unsaturated peroxycarbonate is t-butyl peroxymethacryloyloxyethyl carbonate.

16. The method according to claim 12, wherein said unsaturated peroxycarbonate is t-butyl peroxyacryloyloxyethoxyethyl carbonate.

17. The method according to claim 12, wherein said unsaturated peroxycarbonate is t-butyl peroxymethacryloyloxyethoxyethyl carbonate.

18. The method according to claim 12, wherein said unsaturated peroxycarbonate is t-butyl peroxyacryloyloxyisopropyl carbonate.

19. The method according to claim 12, wherein said unsaturated peroxycarbonate is t-butyl peroxymethacryloyloxyisopropyl carbonate.

20. The method according to claim 12, wherein said unsaturated peroxycarbonate is t-butyl peroxyacryloyloxyisopropoxyisopropyl carbonate.

21. The method according to claim 12, wherein said unsaturated peroxycarbonate is t-butyl peroxymethacryloyloxyisopropoxyisopropyl carbonate.

22. The method according to claim 12, wherein said unsaturated monomer is at least one member selected from the group consisting of acrylic acid, methacrylic acid, alkyl esters of acrylic acid having 1 to 8 carbon atoms, alkyl esters of methacrylic acid having 1 to 8 carbont atoms, styrene, nuclear substituted styrenes, acrylonitrile, and vinyl chloride.

23. The method according to claim 12, wherein said polymerization initiator is at least one member selected from the group consisting of dibenzoyl peroxide, dilauroyl peroxide, isobutylyl peroxide, acetylcyclohexyl sulfonyl peroxide, t-butylperoxy pivalate, cumylperoxy neodecanoate, t-butylperoxy acetate, t-butylperoxy benzoate, 1,1-bis(t-butylperoxy)cyclohexane, dicumyl peroxide, di-t-butyl peroxide, azobisisobutyronitrile, 2,2'-azo-bis(2,4-dimethylvaleronitrile), t-butyl hydroperoxide, cumene hydroperoxide, hydrogen peroxide, potassium persulfate and ammonium persulfate.

24. The random copolymer of claim 1, wherein the copolymer has an upper limiting viscosity number of 1.58 (100 ml/g).

* * * * *